United States Patent
Sengoku et al.

(10) Patent No.: US 9,932,652 B2
(45) Date of Patent: Apr. 3, 2018

(54) HOT-STAMPED STEEL

(71) Applicant: NIPPON STEEL & SUMITOMO METAL CORPORATION, Tokyo (JP)

(72) Inventors: Akihiro Sengoku, Sodegaura (JP); Hiroshi Takebayashi, Tokai (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/129,640

(22) PCT Filed: Mar. 31, 2015

(86) PCT No.: PCT/JP2015/060235
§ 371 (c)(1),
(2) Date: Sep. 27, 2016

(87) PCT Pub. No.: WO2015/152284
PCT Pub. Date: Oct. 8, 2015

(65) Prior Publication Data
US 2017/0145532 A1    May 25, 2017

(30) Foreign Application Priority Data
Mar. 31, 2014  (JP) .................. 2014-073814

(51) Int. Cl.
*C22C 38/50* (2006.01)
*C22C 38/32* (2006.01)
(Continued)

(52) U.S. Cl.
CPC .............. *C21D 9/46* (2013.01); *B32B 15/011* (2013.01); *B32B 15/013* (2013.01); *B32B 15/04* (2013.01);
(Continued)

(58) Field of Classification Search
CPC .... C23C 2/28; C23C 2/06; C23C 2/40; C23C 2/00; C23C 2/285; C23C 28/021;
(Continued)

(56) References Cited

U.S. PATENT DOCUMENTS

| 2006/0219334 A1 | 10/2006 | Brodt et al. |
| 2012/0273092 A1 | 11/2012 | Ratte |

(Continued)

FOREIGN PATENT DOCUMENTS

| CN | 1809650 A | 7/2006 |
| CN | 103392022 A | 11/2013 |

(Continued)

OTHER PUBLICATIONS

International Search Report for PCT/JP2015/060235 dated Jun. 30, 2015.
(Continued)

*Primary Examiner* — Michael E. La Villa
(74) *Attorney, Agent, or Firm* — Birch, Stewart, Kolasch & Birch, LLP (57) ABSTRACT

Hot-stamped steel includes: a base metal that is steel including a tempered portion having hardness corresponding to 85% or less of the highest quenching hardness, the highest quenching hardness being defined as a Vickers hardness at a depth position spaced away from a surface by ¼ times a sheet thickness in a case of performing water quenching after heating at a temperature equal to or higher than an $A_{c3}$ point and retention for 30 minutes; and a Zn coating layer that is formed on the tempered portion of the base metal. The Zn coating layer includes a solid-solution layer including a solid-solution phase that contains Fe and Zn that is solid-soluted in Fe, and a lamella layer that includes the solid-solution phase and a capital gamma phase. An area ratio of the lamella layer in the Zn coating layer is 20% or less.

9 Claims, 5 Drawing Sheets (51) Int. Cl.
| | |
|---|---|
| C22C 38/28 | (2006.01) |
| C22C 38/26 | (2006.01) |
| C22C 38/22 | (2006.01) |
| C22C 38/06 | (2006.01) |
| C22C 38/04 | (2006.01) |
| C22C 38/02 | (2006.01) |
| C22C 38/00 | (2006.01) |
| C22C 38/54 | (2006.01) |
| C23C 2/06 | (2006.01) |
| C23C 2/40 | (2006.01) |
| B32B 15/01 | (2006.01) |
| C21D 9/46 | (2006.01) |
| C25D 3/22 | (2006.01) |
| C25D 5/36 | (2006.01) |
| C25D 7/00 | (2006.01) |
| C21D 1/18 | (2006.01) |
| C23C 2/28 | (2006.01) |
| C23C 28/02 | (2006.01) |
| C23C 2/00 | (2006.01) |
| C23C 30/00 | (2006.01) |
| B32B 15/04 | (2006.01) |
| B32B 15/18 | (2006.01) |
| C22C 38/58 | (2006.01) |
| C25D 5/50 | (2006.01) |
| C21D 9/00 | (2006.01) |
| C21D 1/673 | (2006.01) |
| C25D 3/24 | (2006.01) |

(52) U.S. Cl.
CPC ............ *B32B 15/043* (2013.01); *B32B 15/18* (2013.01); *C21D 1/18* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C22C 38/32* (2013.01); *C22C 38/50* (2013.01); *C22C 38/54* (2013.01); *C22C 38/58* (2013.01); *C23C 2/00* (2013.01); *C23C 2/06* (2013.01); *C23C 2/28* (2013.01); *C23C 2/285* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *C25D 3/22* (2013.01); *C25D 5/36* (2013.01); *C25D 5/50* (2013.01); *C25D 7/00* (2013.01); *C21D 1/673* (2013.01); *C21D 9/0068* (2013.01); *C25D 3/24* (2013.01); *Y10T 428/12792* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24983* (2015.01)

(58) Field of Classification Search
CPC ..... C23C 28/023; C23C 28/025; C23C 30/00; C23C 30/005; C22C 18/00; C22C 38/58; C22C 38/00; C22C 38/50; C22C 38/32; C22C 38/28; C22C 38/26; C22C 38/22; C22C 38/06; C22C 38/04; C22C 38/02; C22C 38/002; C22C 38/001; C22C 38/54; B32B 15/013; B32B 15/011; B32B 15/04; B32B 15/043; B32B 15/18; Y10T 428/12792; Y10T 428/12799; Y10T 428/12958; Y10T 428/12972; Y10T 428/12979; Y10T 428/12993; Y10T 428/24942; Y10T 428/2495; Y10T 428/24983
See application file for complete search history.

(56) References Cited

U.S. PATENT DOCUMENTS

| | | | |
|---|---|---|---|
| 2012/0325377 A1* | 12/2012 | Imai | C23C 2/26 148/284 |
| 2013/0048161 A1 | 2/2013 | Matsuda et al. | |
| 2013/0295402 A1 | 11/2013 | Oh et al. | |
| 2013/0295492 A1* | 11/2013 | Hinago | H01G 9/016 429/517 |
| 2014/0004378 A1 | 1/2014 | Tanahashi et al. | |
| 2014/0255725 A1* | 9/2014 | Yamanaka | B21B 3/00 428/659 |

FOREIGN PATENT DOCUMENTS

| | | |
|---|---|---|
| CN | 103443317 A | 12/2013 |
| EP | 2880345 A2 | 11/2013 |
| JP | 2003-73774 A | 3/2003 |
| JP | 2003-126921 A | 5/2003 |
| JP | 2003-129209 A | 5/2003 |
| JP | 2005-240072 A | 9/2005 |
| JP | 2007-500782 A | 1/2007 |
| JP | 2010-150612 A | 7/2010 |
| JP | 2011-173166 A | 9/2011 |
| JP | 2012-530847 A | 12/2012 |
| JP | 2013-244507 A | 12/2013 |
| WO | WO 2011/111333 A1 | 9/2011 |

OTHER PUBLICATIONS

Office Action for TW 104110629 dated Nov. 11, 2015.
Written Opinion of the International Searching Authority for PCT/JP2015/060235 (PCT/ISA/237) dated Jun. 30, 2015.
Chinese Office Action and Search Report issued in Chinese Application No. 201580017009.6, dated May 2, 2017, together with an English translation.
Extended European Search Report issued in European Application No. 15772557.3 dated Sep. 6, 2017.
Benyakovsky M.A. et al, "Producing of Zn coated steel,"Metallurgiya, 1973, pp. 138-143.
Office Action dated Jan. 11, 2018 in Russian Patent Application No. 2016141558, with English Translation.
Smirnov A.V., "Hot-dip galvanizing, GNTI for ferrous and non-ferrous metallurgy"1953, pp. 96-100.

* cited by examiner

FIG. 8 ously performed. According to the hot-stamping, it is possible to produce a structural component having high shape accuracy and high strength. The steel (hot-stamped steel), which is produced by a producing method including the hot-stamping, is disclosed in Patent Document 1, Patent Document 2, and Patent Document 3. The hot-stamped steel, which is disclosed in the Patent Documents, is steel that is produced by performing hot-stamping with respect to a steel sheet coated with a Zn coating layer so as to increase corrosion resistance.

HOT-STAMPED STEEL

TECHNICAL FIELD OF THE INVENTION

The present invention relates to hot-stamped steel that is produced through hot-stamping.

Priority is claimed on Japanese Patent Application No. 2014-073814, filed on Mar. 31, 2014, the content of which is incorporated herein by reference.

RELATED ART

To realize high strength in a structural component used in automobiles, a structural component, which is produced through hot-stamping, may be used. The hot-stamping is a method in which a steel sheet, which is heated to an $A_{C3}$ point or higher, is rapidly cooled down by using a die while pressing the steel. That is, in the hot-stamping, pressing and quenching are simultaneously performed. According to the hot-stamping, it is possible to produce a structural component having high shape accuracy and high strength. The steel (hot-stamped steel), which is produced by a producing method including the hot-stamping, is disclosed in Patent Document 1, Patent Document 2, and Patent Document 3. The hot-stamped steel, which is disclosed in the Patent Documents, is steel that is produced by performing hot-stamping with respect to a steel sheet coated with a Zn coating layer so as to increase corrosion resistance.

As described above, in the hot-stamping, quenching is performed with respect to the steel sheet simultaneously with pressing. In addition, the hot-stamping is suitable to produce a structural component having high shape accuracy and high strength. According to this, typically, the strength (tensile strength) of the hot-stamped steel is as high as approximately 1500 MPa or greater. However, recently, the demand for collision safety in automobiles has increased, and thus a component for automobiles may be required to have impact absorption properties in collision rather than the strength. Typically a material having low strength is preferable so as to increase the impact absorption properties. In the hot-stamped steel, it is known that the strength can be changed to a certain degree by changing the amount of alloy elements in the steel sheet or hot-stamping conditions. However, in a hot-stamping process, it is not preferable to change the hot-stamping conditions in accordance with a component when considering that an increase in pressing load may be caused. According to this, there is a demand for hot-stamped steel that has the same chemical composition as that of hot-stamped steel in which the tensile strength of approximately 1500 MPa or greater is obtained through quenching in the hot-stamping, has corrosion resistance that is equal to or higher than the related art, and has a strength of approximately 600 MPa to 1450 MPa.

However, a method of reducing the strength of the hot-stamped steel is not disclosed in Patent Document 1 to Patent Document 3.

PRIOR ART DOCUMENT

Patent Document

[Patent Document 1] Japanese Unexamined Patent Application, First Publication No. 2003-73774
[Patent Document 2] Japanese Unexamined Patent Application, First Publication No. 2003-129209
[Patent Document 3] Japanese Unexamined Patent Application, First Publication No. 2003-126921

DISCLOSURE OF THE INVENTION

Problems to be Solved by the Invention

The present invention has been made in consideration of the above-described problem. An object of the present invention is to provide hot-stamped steel that has impact absorption properties higher than those of hot-stamped steel having the same chemical composition in the related art, and includes a Zn coating layer excellent in corrosion resistance.

Means for Solving the Problem

The gist of the present invention is as follows.

(1) According to an aspect of the present invention, hot-stamped steel includes: a base metal that is a steel including a tempered portion having hardness corresponding to 85% or less of the highest quenching hardness, the highest quenching hardness being defined as a Vickers hardness at a depth position spaced away from a surface by ¼ times a sheet thickness in a case of performing water quenching after heating to a temperature equal to or higher than an $A_{c3}$ point and retaining for 30 minutes; and a Zn coating layer that is formed on the tempered portion of the base metal, wherein the Zn coating layer includes a solid-solution layer including a solid-solution phase that contains Fe and Zn that is solid-soluted in Fe, a lamella layer that includes the solid-solution phase and a capital gamma phase, and an area ratio of the lamella layer in the Zn coating layer is 20% or less.

(2) In the hot-stamped steel according to (1), the hardness of the tempered portion may be 60% or less of the highest quenching hardness, and the area ratio of the lamella layer in the Zn coating layer may be 5% to 20%.

(3) In the hot-stamped steel according to (1) or (2), the hardness of the tempered portion may be 50% or less of the highest quenching hardness.

(4) In the hot-stamped steel according to any one of (1) to (3), the hardness of the tempered portion may be 180 Hv to 450 Hv.

(5) In the hot-stamped steel according to any one of (1) to (4), the hot-stamped steel may be produced by heating for a predetermined heating time so that the highest heating temperature is the $A_{c3}$ point or higher, working and quenching simultaneously through pressing by using a die, and tempering at a predetermined tempering temperature, and when an $A_{c1}$ point of the base metal is represented by $A_{c1}$, the tempering temperature is represented by T in degrees ° C., and a concentration of Zn in an Fe—Zn solid-solution of a steel after the quenching and before the tempering is represented by C in a unit of % by mass, the following Equation a may be satisfied.

$$A_{c1} \geq T \geq 700 - 4.0 \times (35.0 - C) \tag{a}$$

(6) In the hot-stamped steel according to (5), the tempering temperature may be 700° C. to the $A_{c1}$ point of the base metal.

(7) In the hot-stamped steel according to any one of (1) to (6), a part of the base metal may be the tempered portion.

Effects of the Invention

According to the aspect of the present invention, it is possible to provide a hot-stamped steel having impact absorption properties higher than that of hot-stamped steel having the same chemical composition in the related art, and including a Zn coating layer excellent in corrosion resistance.

EMBODIMENTS OF THE INVENTION

The present inventors have made an investigation with respect to impact absorption properties and corrosion resistance of hot-stamped steel. As a result, the present inventors have obtained the following findings.

As described above, typically, as the strength (tensile strength) of hot-stamped steel becomes lower, impact absorption properties become higher. When tempering is performed with respect to the hot-stamped steel, it is possible to further lower the tensile strength in comparison to hot-stamped steel having the same chemical composition in the related art. That is, it is possible to enhance the impact absorption properties of the hot-stamped steel.

However, when tempering is performed with respect to hot-stamped steel including a Zn coating layer, a structure of the Zn coating layer changes. The change in the structure of the Zn coating layer has an effect on corrosion resistance.

In the related art, a change in the Zn coating layer when performing tempering with respect to the hot-stamped steel including the Zn coating layer has not been reported. According to this, the present inventors have made an investigation with respect to an effect on the Zn coating layer by tempering conditions, and an effect on corrosion resistance by a configuration of the Zn coating layer in the following manner.

First, a plurality of steel sheets, which satisfy a preferred chemical composition to be described later and have a sheet thickness of 1.6 mm, were prepared. Then, the galvanized layer was formed on each of the steel sheets by using a hot dip galvanizing method. A coating weight of galvanized layer was 60 g/m². Hot-stamping was performed with respect to the steel sheet on which the galvanized layer was formed. Specifically, the steel sheet was charged into a heating furnace in which a furnace temperature was set to 900° C. that is a temperature equal to or higher than an $A_{c3}$ point of the steel sheet, and was heated for 4 minutes. At this time, a temperature of the steel sheet reached 900° C. after approximately two minutes after being charged into the furnace. After the heating, the steel sheet was interposed by a flat die equipped with a water-cooling jacket, and the hot-stamping was performed to produce hot-stamped steel. A cooling rate during the hot-stamping was 50° C./second or faster up to a martensitic transformation start point even in a portion in which cooling rate is slow.

Here, an $A_{c1}$ point and the $A_{c3}$ point respectively represent an austenitic transformation initiation temperature and an austenitic transformation termination temperature during heating of the steel sheet. The $A_{c1}$ point and the $A_{c3}$ point can be determined by measuring thermal expansion during heating the steel in a Formaster test and the like. Specifically, the $A_{c1}$ point and the $A_{c3}$ point can be determined by observing volume constriction during transformation from ferrite to austenite. In addition, the martensitic transformation start point can be determined by measuring thermal expansion when rapidly cooling steel that is heated to an austenitizing temperature. Specifically, the martensitic transformation start point can be determined by measuring volume expansion from austenite to martensite.

Tempering was performed with respect to respective hot-stamped steel which were produced. The tempering temperature was set to be different between the respective hot-stamped steel in a range of 150° C. to the $A_{c1}$ point of the base metal. The heating time of the respective hot-stamped steel during tempering was set to 5 minutes.

Micro-structure observation and XRD measurement were performed with respect to the respective hot-stamped steel which was subjected to the tempering at respective tempering temperatures. In addition, the structure of the Zn coating layer was specified on the basis of results of the micro-structure observation and the XRD measurement.

Figure 1:
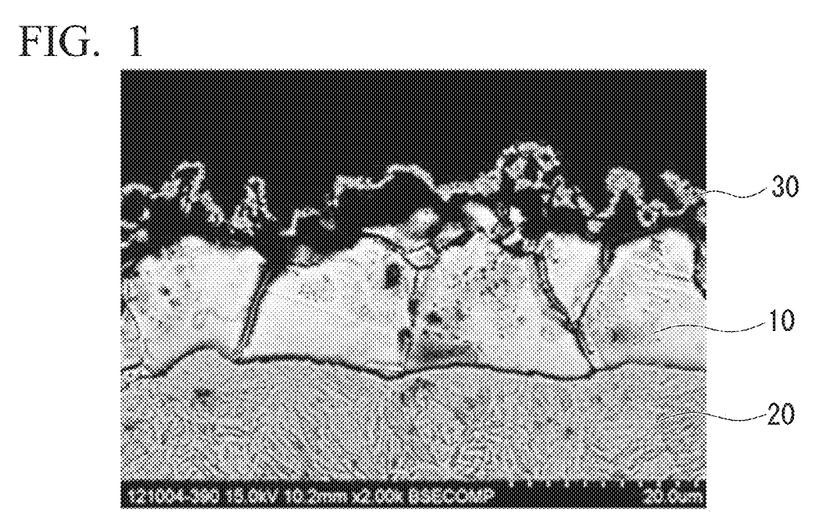
FIG. 1 is a cross-sectional SEM image of a Zn coating layer and the periphery thereof in a case where hot-stamped steel including the Zn coating layer is tempered at 400° C.
Figure 2:
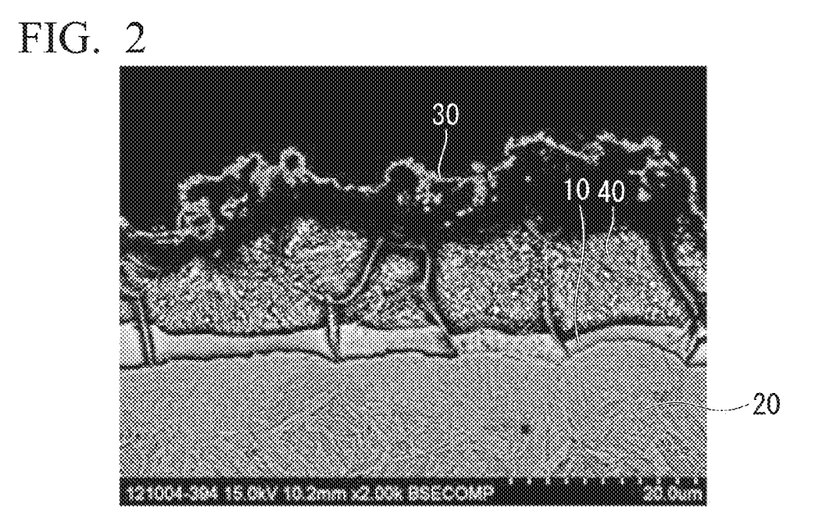
FIG. 2 is a cross-sectional SEM image of the Zn coating layer and the periphery thereof in a case where the hot-stamped steel including the Zn coating layer is tempered at 500° C.
Figure 3:
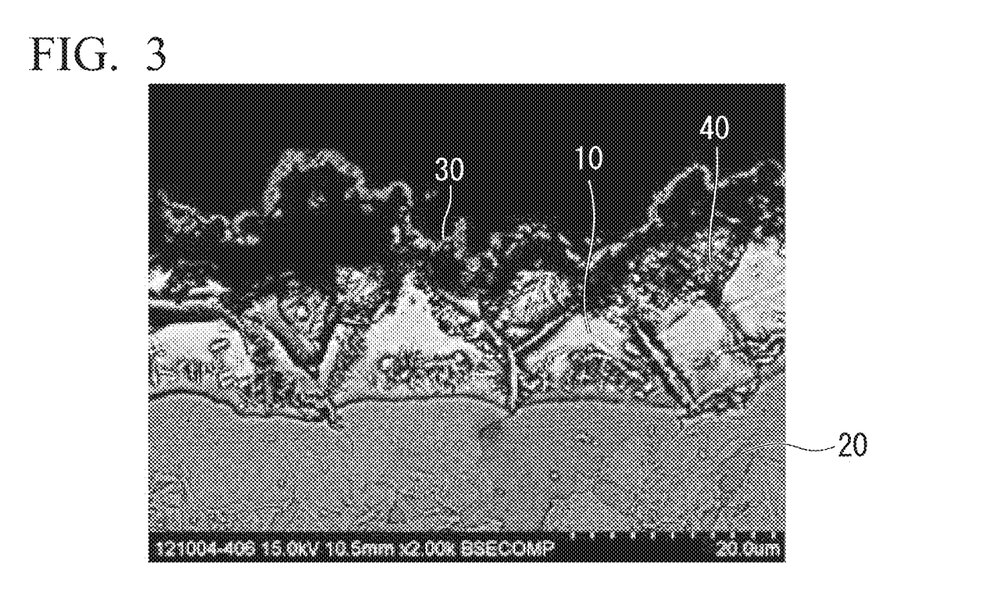
FIG. 3 is a cross-sectional SEM image of the Zn coating layer and the periphery thereof in a case where the hot-stamped steel including the Zn coating layer is tempered at 700° C.
Figure 4:
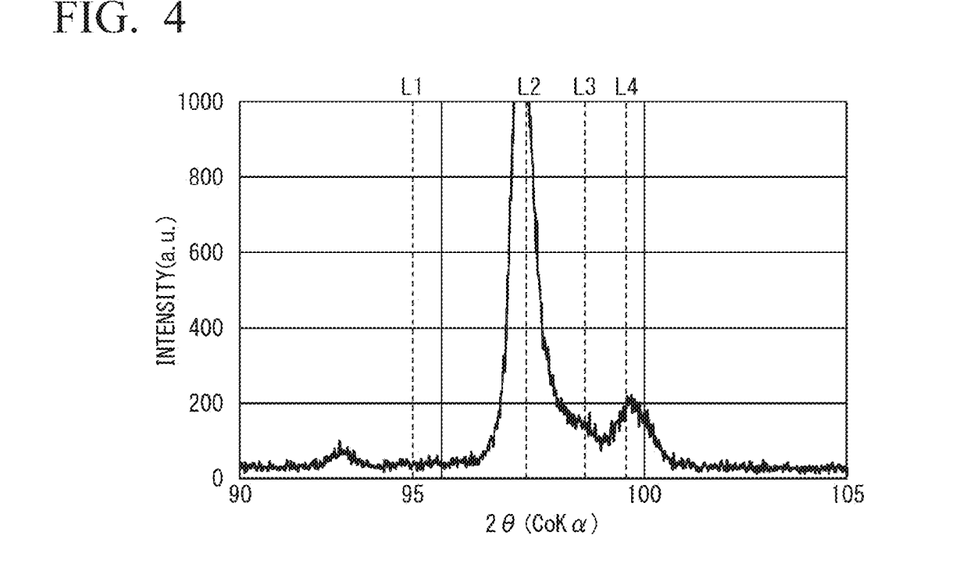
FIG. 4 is a view showing XRD measurement results of the Zn coating layer shown in FIG. 1.
Figure 5:
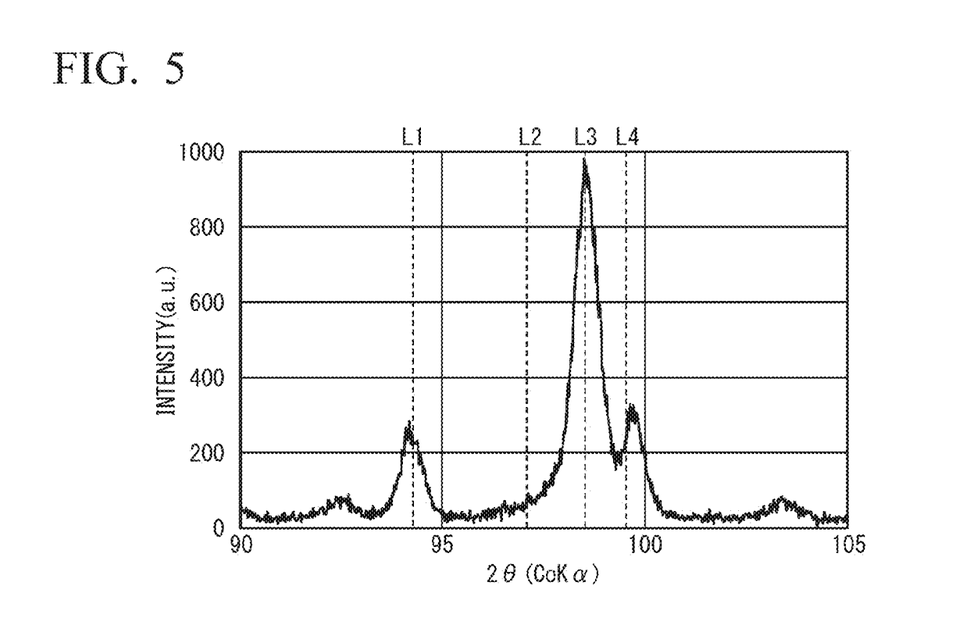
FIG. 5 is a view showing XRD measurement results of the Zn coating layer shown in FIG. 2.
Figure 6:
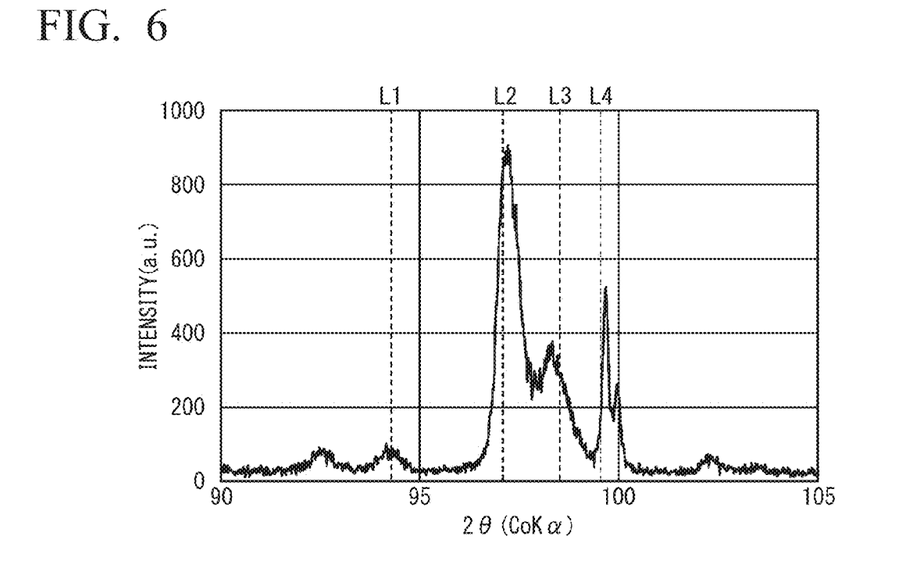
FIG. 6 is a view showing XRD measurement results of the Zn coating layer shown in FIG. 3.

FIG. 1 is a cross-sectional image of the Zn coating layer of the hot-stamped steel and the periphery thereof in a case where the tempering temperature is 400° C., and FIG. 4 represents XRD measurement results from the surface. FIG. 2 is a cross-sectional image of the Zn coating layer of the hot-stamped steel and the periphery thereof in a case where the tempering temperature is 500° C., and FIG. 5 is an XRD measurement result from the surface. FIG. 3 is a cross-sectional image of the Zn coating layer of the hot-stamped steel and the periphery thereof in a case where the tempering temperature is 700° C., and FIG. 6 is an XRD measurement result from the surface.

The micro-structure observation of the cross-section was performed in the following manner. Specifically, the cross-section was etched with 5% nital for 20 seconds to 40 seconds, and after the etching, the micro-structure was observed with an SEM at a magnification of 2000 times. Whether or not an oxide layer is present has hardly any effect on the strength or the corrosion resistance in comparison to the configuration of a Zn coating layer. According to this, an investigation has been made with focus given to the Zn coating layer.

The XRD measurement was performed by using a Co tubular bulb. In XRD, typically, the intensity peak of α-Fe is shown at a diffraction angle of 2θ=99.7°. However, as the solid-solution amount of Zn increases, the intensity peak shifts toward a small-angle side. In addition, the intensity peak of capital gamma (Γ), which is an intermetallic compound of $Fe_3Zn_{10}$, is shown at a diffraction angle of 2θ=94.0°. The broken line L4 in FIG. 4 to FIG. 6 indicates the intensity peak position of the α-Fe phase. A broken line L3 indicates the intensity peak position of a solid-solution phase in which the solid-solution amount of Zn is small (the Zn content is 5% by mass to 25% by mass, and hereinafter, also may be referred to as "low Zn solid-solution phase"). The broken line L2 indicates the intensity peak position of a solid-solution phase in which the solid-solution amount of Zn is large (the Zn content is 25% by mass to 40% by mass, and hereinafter, may also be referred to as "high Zn solid-solution phase"). The broken line L1 indicates the intensity peak position of a Γ-phase. As the intensity peak position shifts from the broken line L4 to the broken line L2, the solid-solution amount of Zn in the solid-solution phase increases.

In a case where the tempering temperature is equal to or higher than 150° C. and lower than 500° C., as shown in FIG. 1 and FIG. 4, the Zn coating layer formed a solid-solution layer 10. The solid-solution layer included the high Zn solid-solution phase in which the intensity peak position is L2, and did not contain the Γ-phase. The reference numeral 20 in FIG. 1 represents a tempered portion in the base metal, and a reference numeral 30 represents a zinc oxide layer formed on the Zn coating layer.

On the other hand, in a case where the tempering temperature is equal to or higher than 500° C. and lower than 700° C., as shown in FIG. 2, the solid-solution layer 10, and a lamella structure layer (hereinafter, referred to as "lamella layer") 40, which included the Γ-phase and the low Zn solid-solution phase and was formed on the solid-solution layer 10, was formed in the Zn coating layer. From results of the XRD measurement, as shown in FIG. 5, the intensity peak (position of the broken line L3) of the low Zn solid-solution phase, and the intensity peak (position of the broken line L1) of the Γ-phase are shown. That is, the lamella structure layer was a layer (lamella layer) of a lamella structure mainly including the Γ-phase and the low Zn solid-solution phase.

In a case where the tempering temperature is equal to or higher than 500° C. and lower than 700° C., the Zn coating layer included the solid-solution layer (including the high Zn solid-solution phase) 10 in an area ratio of 0% to 70%, and the lamella layer 40 in an area ratio of 30% or greater.

In addition, in a case where the tempering temperature is 700° C. to the $A_{c1}$ point of the base metal, as shown in FIG. 3, the Zn coating layer included a slight amount of the lamella layer 40 on a surface layer side, and the solid-solution layer 10 on a lower side (on a steel side) of the lamella layer 40. The area ratio occupied by the lamella layer 40 in the Zn coating layer was 5% to 20%. In addition, from results of the XRD measurement, as shown in FIG. 6, the intensity peak of the solid-solution phase, which was not detected in a case where the tempering temperate was 500° C. to lower than 700° C., was shown again at the position of the broken line L2, and the intensity peak (position of the broken line L1) of the Γ-phase was lowered in comparison to the case where the tempering temperature was 500° C. to lower than 700° C.

As described above, the structure of the Zn coating layer changes depend on the tempering conditions. Accordingly, the corrosion resistance of the hot-stamped steel, which was subjected to the tempering at each tempering temperature, was investigated.

The corrosion resistance was evaluated through an SST test (salt spray test). The SST test was performed in the following manner.

Figure 7:
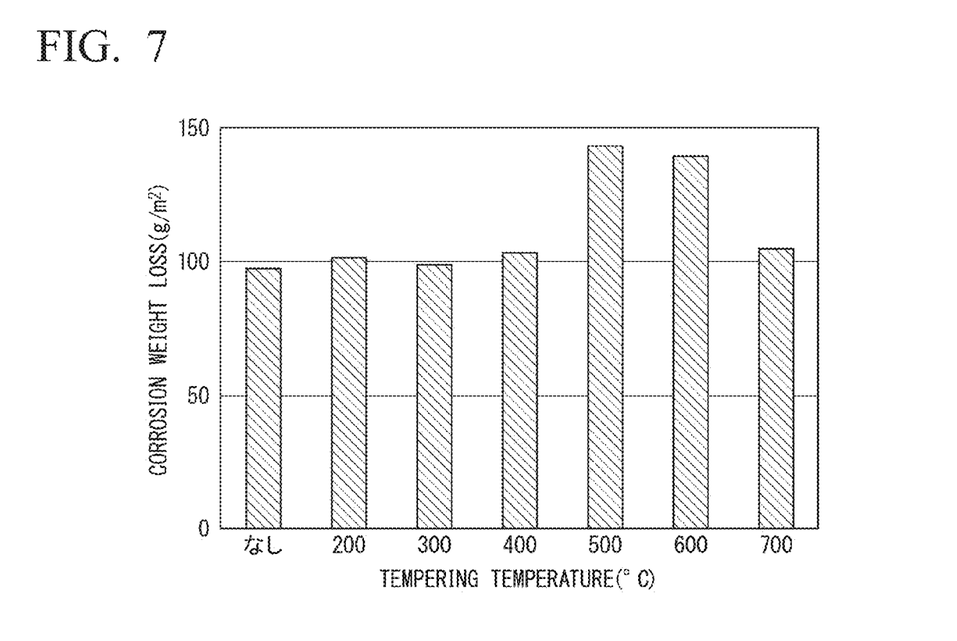
FIG. 7 is a view showing SST test results of the hot-stamped steel that are tempered at tempering temperatures different from each other.

A rear surface and an end surface of sheet-shaped hot-stamped steel tempered at each tempering temperature were sealed with a polyester tape. Then, a surface of each steel sheet was subjected to a test defined by JIS Z2371 "salt water spray test method" for 6 days (144 hours). A corrosion weight loss of the steel after the test was obtained to draw FIG. 7. FIG. 7 is a view showing the corrosion weight loss (g/m$^2$) of the hot-stamped steel after the SST test (salt spray test).

The horizontal axis in FIG. 7 represents the tempering temperature (° C.), and the vertical axis represents the corrosion weight loss (g/m$^2$). Referring to FIG. 7, the corrosion weight loss of hot-stamped steel, in which the tempering temperature was set to 200° C. to 400° C., and 700° C., was in the same level as in hot-stamped steel that was not subjected to tempering, and was 130 g/m$^2$ or less. On the other hand, in hot-stamped steel in which the tempering temperature was set to 500° C. to 600° C., the corrosion weight loss of the Zn coating layer was significantly higher in comparison to hot-stamped steel that was not subjected to tempering.

That is, in a Zn coating layer in which an area ratio of the lamella layer is 20% or less, it is possible to secure the same corrosion resistance as in hot-stamped steel that is not subjected to tempering.

From the above-described results, it was proved that the corrosion resistance can be retained when the area ratio of the lamella layer is 20% or less (including 0%) in the Zn coating layer that includes the solid-solution layer and the lamella layer.

In addition, a surface of hot-stamped steel, which is applied to a component for automobiles, may be frequently subjected to painting. During the painting, a surface with high chemical convertibility has high film adhesiveness. Accordingly, the chemical convertibilities were evaluated with respect to Zn coating layers which are different in the area ratio of the lamella layer. As a result, the present inventors have obtained the following finding. Specifically, when the Zn coating layer includes the lamella layer in an area ratio of 5% or greater, the chemical convertibility is improved.

Next, hot-stamping was performed by using the same raw materials under the same conditions except that the heating time during hot-stamping was set to 6 minutes or 8 minutes. In addition, an effect on the Zn coating layer by the tempering conditions was evaluated with respect to respective hot-stamped steel.

Tempering was performed with respect to respective hot-stamped steel which were produced. The tempering temperature was set to be different between the respective hot-stamped steel in a range of 150° C. to the $A_{c1}$ point of the base metal. The heating time of the respective hot-stamped steel during tempering was set to 5 minutes.

As described above, in a case where the heating time during hot-stamping was set to 4 minutes, when the tempering temperature was 500° C. to 700° C., the area ratio of the lamella layer was 30% or greater. However, in a case where the heating time during hot-stamping was set to 6 minutes, even when the tempering temperature was 500° C. or 690° C., the area ratio of the lamella layer in the Zn coating layer was 5% to 20%. In addition, in a case where the heating temperature during hot-stamping was 8 minutes, even when the tempering temperature was 520° C. or 680° C., the area ratio of the Zn coating layer was 5% to 20%.

As described above, even at the same tempering temperature, the area ratio of the lamella layer changed depending on the heating time during hot-stamping. The reason for the change is considered as follows. Specifically, during heating in hot-stamping, the degree of alloying of Zn in the Zn coating layer and Fe in steel as the base metal (specifically, a ratio between Fe and Zn in a Fe—Zn solid-solution) changes depending on the heating time. This is considered to be because a driving force for two-phase separation from the solid-solution phase into the low Zn solid-solution phase and the Γ-phase during tempering decreases depending on the degree of alloying.

The present inventors have made a further investigation, and as a result, they have obtained the following finding. Specifically, when a concentration (% by mass) of Zn in the Fe—Zn solid-solution after hot-stamping and before tempering is set as C, and the tempering temperature is set as T, in a case where the concentration C (% by mass) of Zn in the Fe—Zn solid-solution after the hot-stamping, and the tempering temperature T (° C.) satisfy the following Equation 1 or Equation 2, the area ratio of the lamella layer in Zn coating becomes 20% or less. In addition, in a case where the following Equation 1 is satisfied, the area ratio of the lamella layer becomes 5% to 20%.

$$A_{c1} \geq T \geq 700 - 4.0 \times (35.0 - C) \quad (1)$$

$$T \leq 500 + 8.0 \times (32.5 - C) \quad (2)$$

Provided that, in Equation 2, in a case where C is 32.5 or greater, C is set to 32.5.

Preferably, a relationship of T≥700 or a relationship of T<500 is satisfied.

With regard to the concentration (% by mass) of Zn in the Fe—Zn solid-solution after hot-stamping and before tempering, arbitrary 5 sites on a cross-section of Zn coating are measured with an EPMA, and the average of the Zn content at the 5 sites may be set as the concentration of Zn in the Fe—Zn solid-solution. In a case of performing EPMA analysis with respect to the cross-section of Zn coating, it is effective that a sample is embedded in a resin, the sample is polished, and the sample is etched by using argon ions and the like.

In order to realize impact absorption properties which are more excellent those of hot-stamped steel having the same chemical composition in the related art, it is necessary for the strength to be lower than the strength (tensile strength) after hot-stamping. The present inventors have evaluated hardness of a tempered portion of the base metal in the hot-stamped steel which is subjected to tempering at each tempering temperature.

During hot-stamping, a steel sheet is pressed and quenched by using a die simultaneously. According to this, a structure of the hot-stamped steel becomes a quenched structure. In this embodiment, the Vickers hardness, which is obtained by heating steel at a temperature equal to or higher than austenitizing temperature ($A_{c3}$ point) for 30 minutes, and by subjecting the steel to water quenching, is defined as "highest quenching hardness". It is considered that the highest quenching hardness is approximately the same as hardness of steel after hot-stamping. According to this, in a case where the hardness of the tempered portion of the hot-stamped steel is less than the highest quenching hardness that is obtained by performing measurement by the above-described method with respect to the steel having the same chemical component, it can be said that the impact absorption properties are improved.

Accordingly, the Vickers hardness of the tempered portion of the base metal in the hot-stamped steel, which was subjected to tempering at each tempering temperature, was measured. In addition, steel having the same chemical component was heated at the austenitizing temperature or higher for 30 minutes and was subjected to water quenching. Then, as the highest quenching hardness, the Vickers hardness was measured at a depth spaced away from a surface by ¼ times a sheet thickness.

As a result, it could be seen that if the tempering temperature is higher than 300° C., the hardness of the tempered portion is 85% or less of the highest quenching hardness. In addition, it could be seen that if the tempering temperature satisfies Equation 1, the hardness of the tempered portion becomes 60% or less of the highest quenching hardness, and if the tempering temperature is 700° C. or higher, the hardness of the tempered portion becomes 50% or less of the highest quenching hardness.

Accordingly, if the tempering temperature is higher than 300° C. and lower than 500° C., or satisfies Equation 1, the strength of the hot-stamped steel is lowered, and the corrosion resistance is also retained. In addition, if the tempering temperature satisfies Equation 1, the chemical convertibility is further improved. More preferably, the tempering temperature is 700° C. or higher.

Hereinafter, description will be given of hot-stamped steel according to an embodiment of the present invention (may also be referred to as "hot-stamped steel according to this embodiment").

The hot-stamped steel according to this embodiment has the following characteristics.

(a) The hot-stamped steel includes: a base metal that is steel including a tempered portion having hardness corresponding to 85% or less of the highest quenching hardness, the highest quenching hardness being defined as Vickers hardness at a depth position spaced away from a surface by ¼ times a sheet thickness in a case of performing water quenching after heating at a temperature equal to or higher than the $A_{c3}$ point and retention for 30 minutes; and a Zn coating layer that is formed on the tempered portion of the base metal. The hardness of the tempered portion is preferably 60% or less of the highest quenching hardness, and is more preferably 50% or less.

(b) The Zn coating layer includes a solid-solution layer including a solid-solution phase that contains Fe and Zn that is solid-soluted in Fe, and a lamella layer that includes the solid-solution phase and a capital gamma phase.

(c) An area ratio of the lamella layer in the Zn coating layer is 20% or less, and is preferably 5% to 20%.

The characteristics are based on the above-described finding.

[Base Metal]

The base metal is steel, and is formed, for example, by hot-stamping a steel sheet. In addition, the base metal includes a tempered portion. The tempered portion represents a portion having hardness (Vickers hardness) corresponding to 85% or less of the highest quenching hardness of steel. The highest quenching hardness represents Vickers hardness at a depth position spaced away from a surface by ¼ times a sheet thickness in a case of performing water quenching after heating at a temperature equal to or higher than an austenitizing temperature for 30 minutes. The highest quenching hardness can be measured by using another steel (steel different from the hot-stamped steel having the tempered portion) having the same chemical component.

In the hot-stamped steel according to this embodiment, the base metal includes the tempered portion having hardness corresponding to 85% or less of the highest quenching hardness, and thus tensile strength is lower in comparison to hot-stamped steel which has the same chemical composition and is not subjected to tempering. As a result, the impact absorption properties are excellent.

Martensite is a structure in which hardness is high, and the hardness thereof is greatly lowered through tempering. When the base metal has a chemical composition in which martensitic transformation occurs when being subjected to water quenching, it is easy for the base metal to have the tempered portion having hardness corresponding to 85% or less of the highest quenching hardness. Accordingly, it is preferable that the base metal has a chemical composition in which the martensitic transformation occurs in a case of being subjected the water quenching from a temperature equal to or higher than the $A_{c3}$ point. In addition, it is preferable that the tempered portion includes 95% or greater of tempered martensite and less than 5% of residual austenite in terms of % by volume.

It is not necessary to limit the chemical composition of the base metal. However, it is preferable that the base metal has, for example, the following chemical composition. In a case where the base metal has the following chemical composition, it is advantageous to obtain mechanical characteristics which are appropriate for usage in a component for automobiles. In addition, it is advantageous to include the tempered portion having hardness corresponding to 85% or less of the highest quenching hardness. Hereinafter, "%" related to an element represents % by mass.

C: 0.05% to 0.4%

Carbon (C) is an element that enhances the strength of steel (hot-stamped steel) after hot-stamping. When the C content is too small, it is difficult to obtain the above-described effect. According to this, it is preferable the lower limit of the C content is set to 0.05% so as to obtain the effect, and is more preferably 0.1%. On the other hand, when the C content is too great, toughness of the steel sheet decreases. Accordingly, it is preferable that the upper limit of the C content is set to 0.4%, and is more preferably 0.35%.

Si: 0.5% or less

Silicon (Si) is an element that is unavoidably contained in steel. In addition, Si has an effect of deoxidizing steel. According to this, the Si content may be set to 0.05% or greater for deoxidation. However, when the Si content is great, Si in steel diffuses during heating in the hot-stamping, and thus an oxide is formed on a surface of a steel sheet. The oxide deteriorates phosphate treatability. Furthermore, Si has a function of raising the $A_{c3}$ point of the steel sheet. When the $A_{c3}$ point of the steel sheet rises, there is a concern that a heating temperature during hot-stamping exceeds an evaporation temperature of Zn coating. In a case where the Si content is greater than 0.5%, the above-described problem becomes significant, and thus it is preferable that the upper limit of the Si content is set to 0.5%, and is more preferably 0.3%.

Mn: 0.5% to 2.5%

Manganese (Mn) is an element that enhances hardenability of steel and enhances the strength of the hot-stamped steel. It is preferable that the lower limit of the Mn content is set to 0.5% so as to obtain this effect, and is more preferably 0.6%. On the other hand, even when the Mn content is greater than 2.5%, the effect is saturated. Accordingly, it is preferable that the upper limit of the Mn content is set to 2.5%, and is more preferably 2.4%.

P: 0.03% or less

Phosphorus (P) is an impurity that is contained in steel. P is segregated to a grain boundary, and deteriorates the toughness of and delayed fracture resistance of steel. According to this, it is preferable that the P content is as low as possible. However, in a case where the P content is greater than 0.03%, the effect of P becomes significant, and thus the P content may be set to 0.03% or less.

S: 0.010% or less

Sulfur (S) is an impurity that is contained in steel. S forms a sulfide and deteriorates toughness and delayed fracture resistance of steel. According to this, it is preferable that the S content is as low as possible. However, in a case where the S content is greater than 0.010%, the effect of S becomes significant, and thus the S content may be set to 0.010% or less.

sol. Al: 0.10% or less

Aluminum (Al) is an element that is effective for deoxidation of steel. To obtain this effect, the lower limit of the Al content may be set to 0.01%. However, when the Al content is too great, the $A_{c3}$ point of a steel sheet rises, and the heating temperature necessary during hot-stamping may exceed the evaporation temperature of Zn coating. Accordingly, it is preferable that the upper limit of the Al content is set to 0.10%, and more preferably 0.05%. The Al content in this embodiment is the sol. Al (acid soluble Al) content.

N: 0.010% or less

Nitrogen (N) is an impurity that is unavoidably contained in steel. N is an element that forms a nitride and deteriorates toughness of steel. In addition, in a case where B is contained, N is coupled to B, and reduces the solid-solution amount of B. When the solid-solution amount of B is reduced, the hardenability deteriorates. From the above-described reason, it is preferable that the N content be as low as possible. However, when the N content is greater than 0.010%, the effect of N becomes significant, and thus the N content may be set to 0.010% or less.

For example, the base metal portion of the hot-stamped steel according to this embodiment may have a chemical composition including the above-described elements, and Fe and impurities as the remainder. However, the base metal portion of the hot-stamped steel according to this embodiment may further contain one or more kinds of arbitrary elements selected from B, Ti, Cr, Mo, Nb, and Ni in place of a part of Fe in the chemical composition in the following range so as to improve the strength or toughness.

In this embodiment, the impurity represents a material that is mixed-in from ore and scrap as a raw material during industrially manufacturing a steel material, or due to the manufacturing environment and the like.

B: 0.0001% to 0.0050%

Boron (B) enhances the hardenability of steel, and enhances the strength of the hot-stamped steel. According to this, the preferable lower limit of the B content is 0.0001% to obtain the effect. However, when the B content is too great, the effect is saturated. Accordingly, even in a case where B is contained, it is preferable that the upper limit of the B content is set to 0.0050%.

Ti: 0.01% to 0.10%

Titanium (Ti) is coupled to N, and forms a nitride (TiN). As a result, binding B with N is limited, and thus it is possible to limit the deterioration of hardenability which is caused by formation of BN. In addition, TiN makes an austenite grain size fine during heating in hot-stamping due to a pinning effect, and enhances the toughness of the steel and the like. To obtain this effect, the preferable lower limit of the Ti content is 0.01%. However, when the Ti content is too great, the above-described effect is saturated, and a Ti nitride excessively precipitates, and thus the toughness of steel deteriorates. Accordingly, even when Ti is contained, it is preferable that the upper limit of the Ti content is set to 0.10%.

Cr: 0.1% to 0.5%

Chromium (Cr) enhances the hardenability of steel. To obtain this effect, the preferable lower limit of the Cr content is 0.1%. However, when the Cr content is too great, Cr carbide is formed, and the carbide is less likely to be dissolved during heating in hot-stamping. As a result, austenitizing of steel is less likely to progress, and thus the hardenability deteriorates. Accordingly, even in a case where Cr is contained, it is preferable that the upper limit of the Cr content is set to 0.5%.

Mo: 0.05% to 0.50%

Molybdenum (Mo) enhances the hardenability of steel. To obtain this effect, the preferable lower limit of the Mo content is 0.05%. However, when the Mo content is too great, the above-described effect is saturated. Accordingly, even in a case where Mo is contained, it is preferable that the upper limit of the Mo content is set to 0.50%.

Nb: 0.02% to 0.10%

Niobium (Nb) forms a carbide, and makes a grain size fine during hot-stamping. When the grain size becomes fine, the toughness of steel is improved. To obtain this effect, the preferable lower limit of the Nb content is 0.02%. However, when the Nb content is too great, the above-described effect is saturated, and the hardenability deteriorates. Accordingly, even in a case where Nb is contained, it is preferable that the upper limit of the Nb content is set to 0.10%.

Ni: 0.1% to 1.0%

Nickel (Ni) enhances the toughness of steel. In addition, Ni limits embrittlement caused by molten Zn during heating in hot-stamping of galvanized steel. To obtain this effect, the preferable lower limit of the Ni content is 0.1%. However, when the Ni content is too great, the above-described effect is saturated, and an increase in the cost is caused. Accordingly, even in a case where Ni is contained, it is preferable that the upper limit of the Ni content be set to 1.0%.

A part of the base metal may be the tempered portion, or the entirety of the base metal may be the tempered portion. That is, a micro-structure of the entirety of the base metal may be tempered martensite.

Recently, a component, in which a demand for performance such as strength and ductility is different in accordance with a position, has been required. The performance is called a tailored property. For example, with regard to an automobile component, in a frame component called B pillar (center pillar), an upper portion, which constitutes a getting-on area, is required to have high strength, and a lower portion is required to have high impact absorption properties.

In a case where only a part of the base metal in the hot-stamped steel including the Zn coating layer is configured as the tempered portion, it is possible to obtain a component which includes the high-strength portion and has impact absorption properties. In addition, since the hot-stamped steel includes the Zn coating layer, the corrosion resistance is also excellent.

The tensile strength of the tempered portion is, for example, 600 MPa to 1450 MPa, and the Vickers hardness is 180 Hv to 450 Hv. In this case, the strength of the tempered portion of the hot-stamped steel becomes lower in comparison to hot-stamped steel, which is not subjected to tempering, in the related art. According to this, the impact absorption properties are more excellent in comparison to the hot-stamped steel of the related art.

The Vickers hardness of tempered martensite is lower than Vickers hardness of martensite. Accordingly, it is possible to determine whether or not a micro-structure of the base metal (tempered portion) is tempered martensite in accordance with the Vickers hardness.

The Vickers hardness can be obtained through a Vickers hardness test in conformity to JIS Z2244 (2009). The test force in the Vickers in the Vickers hardness test is set to 10 kgf=98.07 N.

[Zn Coating Layer]

The hot-stamped steel according to this embodiment includes a Zn coating layer at least on the tempered portion of the base metal. The Zn coating layer mainly includes a solid-solution layer. Specifically, the Zn coating layer includes the solid-solution layer, and a lamella layer in an area ratio of 0% to 20%.

The solid-solution layer includes a solid-solution phase. The solid-solution phase contains Fe, and Zn that is solid-soluted in Fe. It is preferable that the Zn content in the solid-solution layer is 25% by mass to 40% by mass, and is more preferably 30% by mass to 40% by mass.

The lamella layer has a lamella structure including a solid-solution phase and a capital gamma ($\Gamma$) phase. As shown in FIG. 2, the lamella structure is a structure in which different phases (the solid-solution phase and the $\Gamma$-phase in this embodiment) are repetitively and alternately adjacent to each other in a layered shape. The $\Gamma$-phase is an intermetallic compound ($Fe_3Zn_{10}$). The Zn content in the solid-solution phase of the lamella layer is 5% by mass to 25% by mass, and is lower than the Zn content in the solid-solution layer. The lamella layer is formed on a surface layer side of the Zn coating layer.

When an area ratio of the lamella layer in the Zn coating layer is greater than 20%, corrosion resistance significantly deteriorates. The reason for the deterioration is that the lamella layer has a lamella structure of the solid-solution phase (low Zn solid-solution phase) and the $\Gamma$-phase as described above. A corrosion potential of the solid-solution phase is different from a corrosion potential of the $\Gamma$-phase. Accordingly, it is considered that galvanic corrosion is likely to occur in the lamella layer, and thus corrosion resistance becomes lower in comparison to the solid-solution layer. According to this, the area ratio of the lamella layer in the Zn coating layer is set to 20% or less.

On the other hand, the lamella layer is more excellent in chemical convertibility in comparison to the solid-solution layer. The reason for this is considered as follows. As described above, the lamella layer has a lamella structure of the solid-solution phase (low Zn solid-solution phase) and the $\Gamma$-phase. In the lamella structure, the solid-solution phase and the $\Gamma$-phase extend in a direction that is approximately perpendicular to a surface of the base metal. In addition, as described above, the lamella layer is formed on a surface layer side of the Zn coating layer. Accordingly, when observing the surface of the Zn coating layer, both of the solid-solution phase and the $\Gamma$-phase are observed. When chemical conversion treatment (phosphate treatment) is performed with respect to the Zn coating layer having the lamella structure as described above, the surface of the Zn coating layer, that is, the lamella layer is etched. At this time, a portion, in which the concentration of Zn is high, is preferentially etched. The concentration of Zn in the $\Gamma$-phase in the lamella layer is higher than the concentration of Zn in the solid-solution phase, and thus the $\Gamma$-phase is preferentially etched in comparison to the solid-solution phase. As a result, fine unevenness is formed on the surface of the Zn coating layer, and thus a phosphate is likely to adhere to the surface. Accordingly, it is considered that the phosphate treatability of the Zn coating layer, which includes the lamella layer on a surface layer side, becomes higher in comparison to the Zn coating layer that includes only the solid-solution layer on the surface layer side. When the area ratio of the lamella layer in the Zn coating layer is 5% or greater, the phosphate treatability of the Zn coating layer are enhanced, and thus it is preferable that the area ratio of the lamella layer in the Zn coating layer is 5% or greater.

That is, when the area ratio of the lamella layer is 5% to 20%, not only the corrosion resistance but also the chemical convertibility is excellent.

The Zn content in the solid-solution phase (the high Zn solid-solution phase or the low Zn solid-solution phase) can be measured by the following method. The Zn content (% by mass) is measured at arbitrary 5 sites on the high Zn solid-solution phase by using electron beam probe microanalyzer (EPMA), and the average of the Zn content at the 5 sites may be defined as the Zn content in the high Zn solid-solution phase. With regard to the low Zn solid-solution phase, the Zn content can be obtained by the same method as in the high Zn solid-solution phase.

The hot-stamped steel according to this embodiment includes the tempered portion having hardness corresponding to 85% or less of the highest quenching hardness. According to this, strength is lower in comparison to hot-stamped steel which has the same chemical composition and is not subjected to tempering, and thus the impact absorption resistance is excellent. In addition, in the Zn coating layer of this embodiment, the proportion occupied by the lamella layer, in which the corrosion resistance decreases, is small. According to this, it is possible to retain excellent corrosion resistance that is approximately the same as corrosion resistance of hot-stamped steel that is not subjected to tempering.

[Method of Producing Hot-Stamped Steel]

The hot-stamped steel according to this embodiment can exhibit the effect thereof without limitation to a producing method thereof as long as the base metal and the Zn coating layer as described above are provided. For example, the hot-stamped steel can be produced by the following producing method including a process of preparing steel that is a base metal (process of preparing the base metal), a process of forming a galvanized layer on the base metal (a galvanizing process), a process of performing hot-stamping with respect to the base metal that includes a Zn coating layer (hot-stamping process), and a process of performing tempering with respect to steel after being subjected to hot-stamping (tempering process). Hereinafter, a description will be given of a preferred example in the respective processes.

[Process of Preparing Base Metal]

First, a steel sheet, which is used as the base metal, is prepared. For example, molten steel having the above-described preferable chemical composition is prepared. Slab is prepared by using the molten steel in accordance with a casting method such as continuous casting. An ingot may be produced in place of the slab by using molten steel in accordance with an ingot-making method. The slab or the ingot, which is produced, is hot-rolled to produce a steel sheet (hot-rolled steel sheet). Pickling may be additionally performed with respect to the hot-rolled steel sheet as necessary, and cold-rolling may be performed with respect to the resultant hot-rolled steel sheet after the pickling to obtain a steel sheet (cold-rolled steel sheet). The hot-rolling, the pickling, and the cold-rolling may be performed by a known method in conformity to characteristics which are required for a component to which the steel sheet is applied.

[Galvanizing Process]

Galvanizing is performed with respect to the above-described steel sheet (the hot-rolled steel sheet or the cold-rolled steel sheet) to form a galvanized layer on a surface of the steel sheet. A method of forming the galvanized layer may be a hot-dip galvanizing, galvannealing, or electrogalvanizing without particular limitation.

For example, formation of the galvanized layer through the hot-dip galvanizing is performed in the following manner. Specifically, a steel sheet is immersed in a galvanizing bath (hot-dip galvanizing bath) so as to allow galvanizing to adhere to a surface of the steel sheet. The steel sheet, to which the galvanizing coating adheres, is pulled up from the galvanizing bath. Preferably, the coating weight of galvanized layer on the surface of the steel sheet is adjusted to 20 $g/m^2$ to 100 $g/m^2$. The coating weight of galvanized layer can be adjusted by adjusting the pulling-up speed of the steel sheet or the flow rate of a wiping gas. The concentration of Al in the hot-dip galvanizing bath is not particularly limited. Through the above-described processes, a steel sheet for hot-stamping (GI), which includes the galvanized layer (hot-dip galvanized layer), is produced.

For example, formation of the galvanized layer through the galvannealing (hereinafter, also referred to "alloying process") is performed in the following manner. Specifically, the steel sheet, on which the hot-dip galvanized layer is formed, is heated to 470° C. to 600° C. After the heating, soaking is performed as necessary, and then the steel sheet is cooled down. The soaking time is preferably 30 seconds or shorter, but there is no limitation of the soaking time. In addition, immediately after heating to the heating temperature, the steel sheet may be cooled down without performing the soaking. The heating temperature and the soaking time are appropriately set in accordance with a desired concentration of Fe in the resultant galvanized layer. The preferable lower limit of the heating temperature in the alloying process is 540° C. Through the above-described alloying process, a steel sheet for hot-stamping (GA), which includes the galvanized layer (galvannealed layer), is produced.

For example, formation of the galvanized layer through the electrogalvanizing is performed in the following manner. Specifically, as an electrogalvanizing bath, any one of a sulfuric acid bath, a hydrochloric acid bath, a zincate bath, and a cyan bath, which are known, is prepared. The above-described steel sheet is pickled, and the steel sheet after the pickling is immersed in the electrogalvanizing bath. A current is allowed to flow through the electrogalvanizing bath in a state in which the steel sheet is set as a negative electrode. According to this, zinc precipitates to a surface of the steel sheet, and thus the galvanized layer (electrogalvanized layer) is formed. Through the above-described processes, a steel sheet for hot-stamping (EG), which includes the electrogalvanized layer, is produced.

In a case where the galvanized layer is the galvannealed layer, and in a case where the galvanized layer is the electrogalvanized layer, a preferable coating weight of the galvanized layer is the same as in the case of the hot-dip galvanized layer. That is, the preferable coating weight of the galvanized layer is 20 $g/m^2$ to 100 $g/m^2$, and is more preferably 40 $g/m^2$ to 80 $g/m^2$.

These galvanized layers contain Zn. Specifically, the chemical composition of the hot-dip galvanized layer and the electrogalvanized layer include Zn and impurities. The chemical composition of the galvannealed layer contains 5% to 20% of Fe, and the remainder includes Zn and impurities.

[Hot-Stamping Process]

Hot-stamping is performed with respect to the above-described steel sheet for hot-stamping. During heating before quenching in the hot-stamping process, it is preferable to perform heating by mainly using radiant heat.

Specifically, first, a steel sheet for hot-stamping is charged into a heating furnace (a gas furnace, an electrical furnace, an infrared furnace, and the like). In the heating furnace, the steel sheet for hot-stamping is heated at the $A_{c3}$ point to 950° C. (the highest heating temperature), and is retained (soaked) at this temperature. Zn in a galvanized layer is liquefied through the heating, and molten Zn and Fe in the galvanized layer mutually diffuse and form a solid-solution phase (Fe—Zn solid-solution phase). After the molten Zn in the galvanized layer is solid-soluted in Fe and becomes a solid-solution phase, the steel sheet is taken out from the heating furnace. Hot-stamping (pressing and quenching) is performed with respect to the steel sheet that is taken out from the heating furnace, thereby obtaining the hot-stamped steel. A preferable soaking time is 30 minutes or shorter. It is preferable that a heating time be as short as possible from the viewpoint of productivity, and is more preferably 0 minutes to 15 minutes.

In the hot-stamping, the steel sheet is pressed by using a die in which a cooling medium (for example, water) is circulated through the inside thereof. When pressing the steel sheet, the steel sheet is quenched due to heat sink from the die. Through the above-described processes, hot-stamped steel is produced.

In the above description, the steel sheet for hot-stamping is heated by using the heating furnace. However, the steel sheet for hot-stamping may be heated through electrical heating. Even in this case, the steel sheet is soaked for a predetermined time through the electrical heating to allow the molten Zn in the galvanized layer to be a solid-solution phase. After the molten Zn in the galvanized layer becomes a solid-solution phase, the steel sheet is pressed by using a die.

[Tempering Process]

Tempering is performed with respect to the hot-stamped steel (steel after the hot-stamping). When tempering is performed with respect to the hot-stamped steel, it is possible to form a tempered portion in the base metal of the hot-stamped steel. When the concentration (% by mass) of Zn in the Fe—Zn solid-solution after the hot-stamping and before the tempering is set as C, a tempering temperature is higher than 300° C. and equal to or lower than 500+8.0× (32.5−C)° C. (provided that, at this time, in a case where C is 32.5 or greater, C is set to 32.5), or 700−4.0×(35.0−C)° C. to the $A_{c1}$ point of the base metal. A preferable tempering temperature is higher than 300° C. and lower than 500° C., or 700° C. to the $A_{c1}$ point of the base metal.

In a case where the tempering temperature is in the above-described range, the Zn coating layer after the tempering mainly includes a solid-solution layer, and an area ratio of the lamella layer becomes 0% to 20%. In addition, the hardness of the tempered portion of the base metal becomes 85% or less of the highest quenching hardness.

In addition, when the tempering temperature is set to 700−4.0×(35.0−C)° C. to the $A_{c1}$ point of the base metal, the area ratio of the lamella layer can be set to 5% to 20%. In addition, when the tempering temperature is set to 700° C. or higher, the hardness of the tempered portion of the base metal can be set to 50% or less of the highest quenching hardness.

The reason for the change in the area ratio of the lamella layer in accordance with the tempering temperature is considered as follows.

Figure 8:
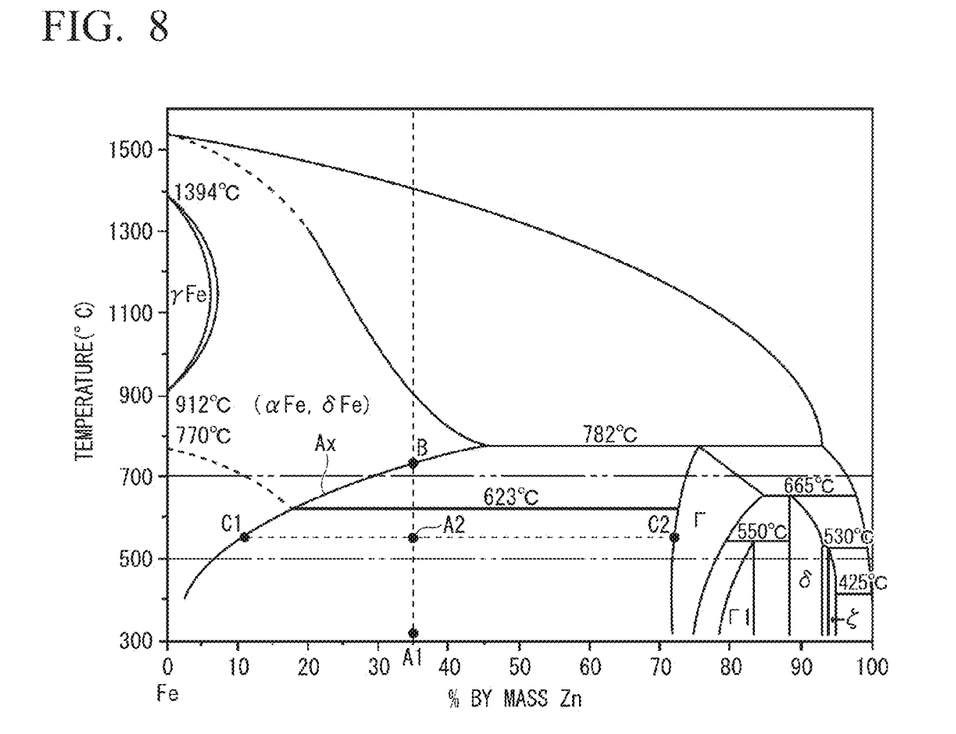
FIG. 8 is a Fe—Zn binary phase diagram.

FIG. 8 is the Fe—Zn binary phase diagram. The Zn coating layer of the hot-stamped steel produced through the hot-stamping includes a solid-solution phase in which approximately 25% by mass to 40% by mass of Zn is solid-soluted in α-Fe. However, a structure (that is, a lamella layer) including two phases, which includes the low Zn solid-solution phase in which 5% by mass to 25% by mass of Zn is solid-soluted in α-Fe, and the Γ-phase, is stable at room temperature in consideration of free energy. That is, the solid-solution phase of the Zn coating layer after the hot-stamping is a solid-solution in which Zn is oversaturated.

On the assumption that the concentration of Zn in the Zn coating layer is 35% by mass in FIG. 8 (corresponds to a point Al in the drawing). In a case where a temperature of the Zn coating layer is raised, a driving force for two-phase separation from the solid-solution phase into the low Zn solid-solution phase and the Γ-phase is generated on a lower temperature side in comparison to a point B on a boundary line Ax, and becomes strong as it goes toward a low temperature side from the point B. On the other hand, as a temperature becomes higher, the diffusion rate in the Zn coating layer increases. Accordingly, whether or not the lamella layer is formed after the tempering is determined from a relationship between the driving force for two-phase separation, and the diffusion rate. Specifically, as the driving force for two-phase separation is higher and the diffusion rate increases, the lamella layer is likely to be formed.

In a case where the temperature (tempering temperature) of the Zn coating layer during the tempering is in a low-temperature region (higher than 300° C. and lower than 500° C.) (for example, a point A1 of 310° C.), it is sufficiently spaced away from the boundary line Ax. In this case, the driving force for two-phase separation is high. However, since a temperature is low, the diffusion rate is too slow. According to this, even when performing the tempering, the Zn coating layer is not separated into the two phases, and the lamella layer is not formed.

In a case where the tempering temperature is 500° C. to lower than 700° C., the temperature region is close to the boundary line Ax, but a certain degree of distance is present (for example, a point A2 in the drawing). In this case, the driving force for two-phase separation is present to a certain extent. In addition, the temperature region increases, and thus the diffusion rate is fast. As a result, the Zn coating layer is separated into the two phases to form the lamella layer. At A2 in FIG. 8, the Zn coating layer is separated into the Γ-phase in which the Zn content is approximately 70% by mass (C2 in the drawing) and the solid-solution phase in which the Zn content is approximately 10% by mass (C1 in the drawing). As a result, the lamella layer is formed.

When the tempering temperature further rises and reaches 700° C. or higher, the temperature region approaches the vicinity of the boundary line Ax. In this case, the diffusion rate becomes fast due to the temperature rise, but the driving force for two-phase separation is very small. As a result, separation into the two phases is less likely to occur. However, the temperature region does not exceed the boundary line Ax, and thus a small amount of lamella layer is formed. According to this, the area ratio of the lamella layer becomes 5% to 20%. When the tempering temperature exceeds the boundary line Ax (when the tempering temperature exceeds the $A_{c1}$ point), the driving force for two-phase separation is not generated, and thus the lamella layer is not formed.

In a case where the tempering temperature is 300° C. or lower, the diffusion rate is slow, and thus the area ratio of the lamella layer becomes 20% or less. On the other hand, the strength of the tempered portion is less likely to decrease, and the hardness of the tempered portion exceeds 85% of the highest quenching hardness.

Accordingly, as described above, in a case where the concentration of Zn in the Zn coating layer is 35% by mass in FIG. 8, when the tempering temperature is set to be higher than 300° C. and lower than 500° C., or 700° C. to the $A_{c1}$ point of the base metal, the area ratio of the lamella layer in the Zn coating layer can be set to 20% or less, and the hardness of the tempered portion can be set to be 85% or less of the highest quenching hardness.

The tempering can be performed with respect to only a part of the hot-stamped steel. For example, the tempering can be performed with respect to a part of the hot-stamped steel through induction heating by using a high frequency or electrical heating.

When the tempering is performed with respect to only a part of the hot-stamped steel, strength can be made to change in the same component between a portion for which the tempering is performed and a portion for which the tempering is not performed. For example, a component as described above is applicable to a component such as a B pillar of an automobile in which an upper portion is required to have high strength and a lower portion is required to have high impact absorption properties.

In addition, a tempered portion even in the partial tempering is the same as the tempered portion in a case where the entirety is tempered.

The hot-stamped steel is produced by performing quenching while being pressed by using a die after heating, and by performing tempering in a temperature range of higher than 300° C. and equal to or lower than 500+8.0×(32.5–C)° C., or a temperature range of 700–4.0×(35.0–C)° C. to the $A_{c1}$ point of the base metal.

Through the above-described processes, it is possible to produce a hot-stamped steel which includes the base metal that is steel including the tempered portion having hardness corresponding to 85% or less of the highest quenching hardness, and the Zn coating layer that is formed on the tempered portion of the base metal and includes the solid-solution layer and the lamella layer, and in which the area ratio of the lamella layer in the Zn coating layer is 20% or less.

The method of producing the hot-stamped steel according to this embodiment may further include the following processes.

[Anti-Rust Oil Film Forming Process]

The above-described producing method may further include an anti-rust oil film forming process between the galvanizing process and the hot-stamping process.

In the anti-rust oil film forming process, an anti-rust oil is applied to a surface of the steel sheet for hot-stamping to form the anti-rust oil film. The steel sheet for hot-stamping may be left for a long period of time before performing the hot-stamping process after being rolled. In this case, the surface of the steel sheet for hot-stamping may be oxidized. According to this process, the anti-rust oil film is formed on the surface of the hot-stamped steel, and thus the surface of the steel sheet is less likely to be oxidized. Accordingly, generation of scale is limited.

[Blanking Process]

In addition, the above-described producing method may further include a blanking process between the anti-rust oil film forming process and the hot-stamping process.

In the blanking process, shearing and/or punching, and the like are performed with respect to the steel sheet for hot-stamping for shaping (blanking) into a specific shape. A shear plane of the steel sheet after the blanking is likely to be oxidized. However, when the anti-rust oil film is formed on the surface of the steel sheet, an anti-rust oil also spreads to the shear plane to a certain extent. According to this, oxidation of the steel sheet after the blanking is limited.

EXAMPLES

Steel sheets of Steel Nos. A to G, which have chemical compositions shown in Table 1, were prepared.

TABLE 1

| Kinds of steel | Sheet thickness (mm) | Chemical composition (unit is % by mass, and the remainder includes Fe and impurities) | | | | | | | | | | | | | Highest quenching hardness B0 (HV) |
|---|---|---|---|---|---|---|---|---|---|---|---|---|---|---|---|
| | | C | Si | Mn | P | S | sol. Al | N | B | Ti | Cr | Mo | Nb | Ni | |
| A | 1.6 | 0.2 | 0.2 | 1.3 | 0.01 | 0.005 | 0.02 | 0.002 | 0.002 | 0.02 | 0.2 | — | — | — | 514 |
| B | 1.6 | 0.2 | 0.5 | 1.3 | 0.01 | 0.005 | 0.02 | 0.002 | 0.002 | 0.02 | 0.2 | — | — | — | 512 |
| C | 1.6 | 0.2 | 0.5 | 1.3 | 0.01 | 0.005 | 0.02 | 0.002 | 0.002 | 0.02 | 0.2 | — | 0.05 | — | 519 |
| D | 1.6 | 0.2 | 0.5 | 1.3 | 0.01 | 0.005 | 0.02 | 0.002 | 0.002 | 0.02 | 0.2 | — | — | 1.0 | 518 |
| E | 1.6 | 0.2 | 0.5 | 1.3 | 0.01 | 0.005 | 0.02 | 0.002 | 0.002 | 0.02 | 0.2 | 0.5 | — | — | 519 |
| F | 1.6 | 0.2 | 0.2 | 1.3 | 0.01 | 0.005 | 0.02 | 0.002 | — | — | — | — | — | — | 515 |
| G | 1.6 | 0.3 | 0.2 | 1.3 | 0.01 | 0.005 | 0.02 | 0.002 | 0.002 | 0.02 | 0.2 | — | — | — | 609 |

Referring to Table 1, it could be seen that a chemical composition of any steel is in a range of a preferable chemical composition of the steel sheet of this embodiment.

Slab was prepared by using molten steel having each of the above-described chemical compositions in accordance with continuous casting method. The slab was hot-rolled to obtain a hot-rolled steel sheet. The hot-rolled steel sheet was pickled, and after pickling, cold-rolling was performed to obtain a cold-rolled steel sheet having a sheet thickness of 1.6 mm. The cold-rolled steel sheet, which was obtained, was set as a steel sheet that is used to produce the hot-stamped steel.

To investigate the highest quenching hardness, a part of a steel sheet having each of the chemical compositions of Steel Nos. A to G was collected, and was heated at a temperature of the $A_{c3}$ point or higher. Then, water quenching was performed after retention for 30 minutes. In any kind of steel sheet, a structure after the water quenching was full martensite.

The Vickers hardness was measured with respect to the steel sheet after the water quenching, and the Vickers hardness that was obtained was defined as the highest quenching hardness (HV) of each kind of steel. A Vickers hardness test was performed in conformity to JIS Z2244 (2009), and the test force was set to 10 kgf=98.07 N.

Galvanizing, hot-stamping, and tempering were performed by using each of cooled-rolled steel sheets having the chemical compositions of Steel Nos. A to F under conditions shown in Table 2, thereby producing hot-stamped steel in each of Test Nos. 1 to 23.

Galvanizing was performed with respect to each of steel sheets of Test Nos. 1 to 23. In Test No. 6, a hot-dip galvanized layer (GI) was formed on the steel sheet through hot-dip galvanizing. In Test Numbers other than Test No. 6, an alloying process was further performed with respect to the steel sheet including the hot-dip galvanized layer to form a galvannealed layer (GA). In the alloying process, the highest temperature was set to approximately 530° C., and after heating for approximately 30 seconds, cooling was performed to room temperature.

The Fe content in the galvannealed layer was 12% in terms of % by mass. The Fe content was measured by the following measurement method. First, a sample of a steel sheet including the galvannealed layer was collected. The Fe content (% by mass) was measured at arbitrary 5 sites inside the galvannealed layer in the sample by using electron probe micro analyzer (EPMA). The average of the resultant measured values was defined as the Fe content (% by mass) of the galvannealed layer of a corresponding test number.

The coating weight of the galvanized layer (the hot-dip galvanized layer or the galvannealed layer) was measured by the following method. First, a sample including a galvanized layer was collected from each of the steel sheets, and the galvanized layer of the sample was dissolved in hydrochloric acid in conformity to JIS H0401. The coating weight (g/m$^2$) of Zn coating was obtained on the basis of a sample weight before dissolution, the sample weight after dissolution, and the galvanized layer formed area. The measured results are shown in Table 2.

After forming the galvanized layer, hot-stamping was performed with respect to the steel sheet in each of the test numbers. Specifically, the steel sheet was charged into a heating furnace in which the furnace temperature was set to 900° C., that is a temperature equal to or higher than the $A_{c3}$ point of the steel sheet, and was heated at 900° C., that is a temperature equal to or higher than the $A_{c3}$ point of each of the Steel Nos. A to F by using radiant heat for 4 minutes to 8 minutes. At this time, the temperature of the steel sheet reached 900° C. after approximately 2 minutes after being charged into the furnace, and the steel sheet was soaked at 900° C. for 2 minutes to 6 minutes.

After soaking, the steel sheet was interposed by a flat die equipped with a water-cooling jacket to produce the hot-stamped steel (steel sheet). At this time, even at a portion in which a cooling rate during the hot-stamping was slow, quenching was performed in such a manner that a cooling rate up to a martensitic transformation start point became 50° C./second. After the hot-stamping, the concentration of Zn in the Fe—Zn solid-solution was obtained by the EPMA.

In addition, tempering was performed with respect to Test Nos. 1 to 14, and 16 to 23 after hot-stamping. In this example, each steel was charged into a heat treatment furnace. That is, tempering was performed with respect to entirety of each of the steel sheets. The tempering temperature in each test number was set as shown in Table 2, and the heating time was set to 5 minutes. Tempering was not performed with respect to steel of Test No. 15. Through the above-described processes, hot-stamped steel in each of Test Nos. 1 to 23 was produced.

A Vickers hardness test and micro-structure observation of the Zn coating layer were performed with respect to the hot-stamped steel in each of Test Nos. 1 to 14. In addition, phosphate treatability evaluation test was performed so as to evaluate chemical convertibility.

[Vickers Hardness Test]

A sample was collected from the base metal of the steel (steel sheet) in each of the test numbers at the center in a sheet thickness direction. The Vickers hardness test conforming to JIS Z2244 (2009) was performed with respect to a surface (corresponding to a surface perpendicular to a rolling direction of the steel sheet) of the sample. The test force was set to 10 kgf=98.07 N. B1/B0×100(%), which is a ratio between Vickers hardness B1 (HV10) that was obtained and the highest quenching hardness B0, is shown in Table 2.

[Micro-Structure Observation of Zn Coating Layer]

A sample including the Zn coating layer was collected from steel in each of the test numbers. Among surfaces of the sample, a cross-section perpendicular to the rolling direction was etched with 5% by mass of nital. A cross-section of the Zn coating layer that was etched was observed with a SEM at a magnification of 2000 times to determine whether or not the solid-solution layer and the lamella layer were present.

In a case where the lamella layer was observed, the area ratio of the lamella layer was further obtained by the following method. At 5 arbitrary visual fields (50 μm×50 μm) on the cross-section, the area ratio (%) of the lamella layer with respect to the entirety of the area of the Zn coating layer was obtained. At this time, a Zn oxide layer (indicated by a reference numeral 30 in FIG. 1), which floats to a surface, was not included to the area of the Zn coating layer. Area ratios (%) of the solid-solution layer and the lamella layer, which were obtained, are shown in Table 2.

Measurement by the EPMA was performed with respect to the solid-solution layer, which was observed through the micro-structure observation, by the above-described method. As a result, Zn in the solid-solution layer, which was observed, was 25% by mass to 40% by mass in all cases.

[SST Test (Salt Spray Test)]

The SST test was performed with respect to the hot-stamped steel in each of the test numbers by the following method. A rear surface and an end surface of the hot-stamped steel (steel sheet) in each of the test numbers were sealed with a polyester tape. Then, a surface of each steel was subjected to a test defined by JIS Z2371 "salt water spray test method" for 6 days (144 hours). The corrosion weight loss (g/m$^2$) of the steel after the test was obtained. The corrosion weight loss, which was obtained, is shown in Table 2.

[Phosphate Treatability Property Evaluation Test]

Surface conditioning was performed with respect to the hot-stamped steel in each of the test numbers at room temperature for 20 seconds using a surface conditioning agent (PREPALENE (product name), produced by Nihon Parkerizing Co., Ltd.). In addition, a phosphate treatment was performed using a zinc phosphate treatment solution (PEARLBOND 3020 (product name), produced by Nihon Parkerizing Co., Ltd.). The temperature of the treatment solution was set to 43° C., and the hot-stamped steel was immersed in the treatment solution for 120 seconds.

After the phosphate treatment, arbitrary 5 visual fields (125 μm×90 μm) of the hot-stamped steel were observed with a scanning electron microscope (SEM) at a magnification of 1000 times, and binarization processing was performed with respect to the resultant SEM image. In a binarized image, a fine chemical crystal was formed at a white portion. As the fine chemical crystal is much, the phosphate treatability is high. According to this, the area ratio TR of a white portion was obtained by using the binarized image. In a case where the area ratio TR was the same as in a case where the tempering was not performed, this case was regarded as "OK", and in a case where the area ratio TR was 30% or greater, it was determined that the phosphate treatability was improved, and this case was regard as "GOOD". Results are shown in Table 2.

TABLE 2

| Test No. | Kinds of steel | after galvanizing Coating Composition | Coating weight (g/m²) | Ac1 (° C.) | Ac3 (° C.) | HS heating conditions Temperature (° C.) | HS heating conditions Time (min) | Concentration of Zn in Fe—Zn solid-solution after hot-stamping (mass %) | Tempering heating conditions Temperature (° C.) | Tempering heating conditions Time (min) |
|---|---|---|---|---|---|---|---|---|---|---|
| 1 | A | Zn-12% Fe | 60 | 727 | 810 | 900 | 4 | 35.0 | 300 | 5 |
| 2 | B | Zn-12% Fe | 60 | 727 | 823 | 900 | 4 | 35.0 | 350 | 5 |
| 3 | C | Zn-12% Fe | 60 | 727 | 823 | 900 | 4 | 35.0 | 420 | 5 |
| 4 | D | Zn-12% Fe | 60 | 727 | 823 | 900 | 4 | 35.0 | 420 | 5 |
| 5 | E | Zn-12% Fe | 60 | 727 | 823 | 900 | 4 | 35.0 | 370 | 5 |
| 6 | F | Zn | 60 | 727 | 804 | 900 | 4 | 35.0 | 150 | 5 |
| 7 | F | Zn-12% Fe | 60 | 727 | 804 | 900 | 4 | 35.0 | 200 | 5 |
| 8 | F | Zn-12% Fe | 60 | 727 | 804 | 900 | 4 | 35.0 | 300 | 5 |
| 9 | F | Zn-12% Fe | 60 | 727 | 804 | 900 | 4 | 35.0 | 400 | 5 |
| 10 | F | Zn-12% Fe | 60 | 727 | 804 | 900 | 4 | 35.0 | 460 | 5 |
| 11 | F | Zn-12% Fe | 60 | 727 | 804 | 900 | 4 | 35.0 | 500 | 5 |
| 12 | F | Zn-12% Fe | 60 | 727 | 804 | 900 | 4 | 35.0 | 600 | 5 |
| 13 | F | Zn-12% Fe | 60 | 727 | 804 | 900 | 4 | 35.0 | 700 | 5 |
| 14 | F | Zn-12% Fe | 60 | 727 | 804 | 900 | 4 | 35.0 | 720 | 5 |
| 15 | F | Zn-12% Fe | 60 | 727 | 804 | 900 | 4 | 35.0 | — | — |
| 16 | F | Zn-12% Fe | 60 | 727 | 804 | 900 | 6 | 32.5 | 500 | 5 |
| 17 | F | Zn-12% Fe | 60 | 727 | 804 | 900 | 6 | 32.5 | 520 | 5 |
| 18 | F | Zn-12% Fe | 60 | 727 | 804 | 900 | 6 | 32.5 | 600 | 5 |
| 19 | F | Zn-12% Fe | 60 | 727 | 804 | 900 | 6 | 32.5 | 690 | 5 |
| 20 | F | Zn-12% Fe | 60 | 727 | 804 | 900 | 8 | 30.0 | 500 | 5 |
| 21 | F | Zn-12% Fe | 60 | 727 | 804 | 900 | 8 | 30.0 | 520 | 5 |
| 22 | F | Zn-12% Fe | 60 | 727 | 804 | 900 | 8 | 30.0 | 600 | 5 |
| 23 | F | Zn-12% Fe | 60 | 727 | 804 | 900 | 8 | 30.0 | 680 | 5 |

| Test No. | 700 − 4.0 × (35.0 − C) | 500 + 8.0 × (32.5 − C) | Hot-stamped steel Solid-solution layer Area ratio (%) | Lamella layer Area ratio (%) | Vickers hardness Hardness B1 (HV10) | B1/B0 (%) | Corrosion weight loss (g/m²) | chemical convertibility |
|---|---|---|---|---|---|---|---|---|
| 1 | 700 | 480 | 100 | 0 | 446 | 86.8 | 99.2 | OK |
| 2 | 700 | 480 | 100 | 0 | 422 | 82.4 | 100.1 | OK |
| 3 | 700 | 480 | 100 | 0 | 401 | 77.3 | 102.8 | OK |
| 4 | 700 | 480 | 100 | 0 | 397 | 76.6 | 99.7 | OK |
| 5 | 700 | 480 | 100 | 0 | 423 | 81.5 | 98.8 | OK |
| 6 | 700 | 480 | 100 | 0 | 502 | 97.5 | 96.9 | OK |
| 7 | 700 | 480 | 100 | 0 | 509 | 98.8 | 101.4 | OK |
| 8 | 700 | 480 | 100 | 0 | 445 | 86.4 | 98.9 | OK |
| 9 | 700 | 480 | 100 | 0 | 414 | 80.4 | 103.1 | OK |
| 10 | 700 | 480 | 80 | 20 | 361 | 70.1 | 108.9 | GOOD |
| 11 | 700 | 480 | 30 | 70 | 325 | 63.1 | 143.2 | GOOD |
| 12 | 700 | 480 | 10 | 90 | 275 | 53.4 | 139.6 | GOOD |
| 13 | 700 | 480 | 80 | 20 | 234 | 45.4 | 104.6 | GOOD |
| 14 | 700 | 480 | 90 | 10 | 214 | 41.6 | 101.5 | GOOD |
| 15 | 700 | 480 | 100 | 0 | 484 | 94.0 | 97.1 | OK |
| 16 | 690 | 500 | 80 | 20 | 328 | 63.7 | 105.7 | GOOD |
| 17 | 690 | 500 | 60 | 40 | 309 | 60.0 | 130.4 | GOOD |
| 18 | 690 | 500 | 40 | 60 | 274 | 53.2 | 135.8 | GOOD |
| 19 | 690 | 500 | 80 | 20 | 253 | 49.1 | 102.8 | GOOD |
| 20 | 680 | 520 | 90 | 10 | 326 | 63.3 | 108.3 | GOOD |
| 21 | 680 | 520 | 80 | 20 | 251 | 48.7 | 101.2 | GOOD |
| 22 | 680 | 520 | 50 | 50 | 278 | 54.0 | 124.2 | GOOD |
| 23 | 680 | 520 | 80 | 20 | 255 | 49.5 | 102.5 | GOOD |

[Test Result]

Referring to Table 2, in Test Nos. 2 to 5, 9, 10, 13, 14, 16, 19, 20, 21, and 23, the tempering temperature was appropriate. According to this, the hardness B1 of the tempered portion was 85% or less of the highest quenching hardness B0.

In addition, the area ratio of the solid-solution layer in the Zn coating layer was 80% or greater, and the area ratio of the lamella layer was 20% or less. As a result, the corrosion weight loss in the SST test was 130 g/m² or less, and was approximately the same as the corrosion weight loss of Test No. 15 in which the tempering was not performed.

On the other hand, in Test Nos. 1, and 6 to 8, the tempering temperature was too low. According to this, the area ratio of the lamella layer was 20% or less, but the hardness B1 of the tempered portion was higher than 85% of the highest quenching hardness B0. In addition, in Test No. 15, since the tempering was not performed, B1 became a value close to B0.

In Test Nos. 11, 12, 17, 18, and 22, the tempering temperature deviated from the preferable range, and thus the area ratio of the lamella layer in the Zn coating layer was greater than 20%. According to this, the corrosion weight loss greatly exceeded 130 g/m².

In addition, in a case where the area ratio of the lamella layer in the Zn coating layer was equal to or greater than 5% to 20%, the corrosion resistance did not deteriorate, and the chemical convertibility was improved.

Overall evaluation was performed in Table 3 by collecting the above described results.

With regard to hardness, in a case where B1/B0×100 was 85(%) or less, evaluation was made as "GOOD", and in a case where B1/B0×100 was greater than 85(%), evaluation was made as "NG". In addition, with regard to the corrosion resistance, in a case where the corrosion weight loss in the SST test was 130 g/m² or less, evaluation was made as "GOOD", and in a case where the corrosion weight loss was greater than 130 g/m², evaluation was made as "NG". In addition, in a case where all of the hardness and the corrosion resistance were "GOOD", overall evaluation was made as "GOOD", and in a case where any one of the hardness and the corrosion resistance was "NG", overall evaluation was made as "NG".

TABLE 3

| Test Nos. | Hardness | Corrosion resistance | Overall |
|---|---|---|---|
| 1 | NG | GOOD | NG |
| 2 | GOOD | GOOD | GOOD |
| 3 | GOOD | GOOD | GOOD |
| 4 | GOOD | GOOD | GOOD |
| 5 | GOOD | GOOD | GOOD |
| 6 | NG | GOOD | NG |
| 7 | NG | GOOD | NG |
| 8 | NG | GOOD | NG |
| 9 | GOOD | GOOD | GOOD |
| 10 | GOOD | GOOD | GOOD |
| 11 | GOOD | NG | NG |
| 12 | GOOD | NG | NG |
| 13 | GOOD | GOOD | GOOD |
| 14 | GOOD | GOOD | GOOD |
| 15 | NG | GOOD | NG |
| 16 | GOOD | GOOD | GOOD |
| 17 | GOOD | NG | NG |
| 18 | GOOD | NG | NG |
| 19 | GOOD | GOOD | GOOD |
| 20 | GOOD | GOOD | GOOD |
| 21 | GOOD | GOOD | GOOD |
| 22 | GOOD | NG | NG |
| 23 | GOOD | GOOD | GOOD |

Hereinbefore, the embodiment of the present invention has been described. However, the above-described embodiment is only illustrative examples of carrying-out the present invention. Accordingly, the present invention is not limited to the above-described embodiment, and the present invention can be carried out by appropriately modifying the above-described embodiment in a range not departing from the gist of the present invention.

INDUSTRIAL APPLICABILITY

According to the present invention, it is possible to provide hot-stamped steel that has impact absorption properties higher than those of hot-stamped steel having the same chemical composition in the related art, and includes a Zn coating layer excellent in corrosion resistance.

BRIEF DESCRIPTION OF THE REFERENCE SYMBOLS

10: SOLID-SOLUTION LAYER
20: TEMPERED PORTION
30: Zn OXIDE LAYER
40: LAMELLA LAYER

What is claimed is:

1. A hot-stamped steel comprising:
a base metal that is a steel sheet including a tempered portion having a hardness corresponding to 85% or less of the highest quenching hardness, the highest quenching hardness being defined as a Vickers hardness at a depth position spaced away from a surface by ¼ times a sheet thickness in a case of performing water quenching after heating to a temperature equal to or higher than an $A_{c3}$ point and retaining for 30 minutes;
wherein either a part of the base metal may be the tempered portion or an entirety of the base metal is the tempered portion, and
a Zn coating layer that is formed on the tempered portion of the base metal,
wherein the Zn coating layer includes:
a solid-solution layer including a solid-solution phase that contains Fe and Zn that is solid-soluted in Fe, and
a lamella layer that includes the solid-solution phase and a capital gamma phase, and
an area ratio of the lamella layer in a vertical cross section in the Zn coating layer is 20% or less.

2. The hot-stamped steel according to claim 1,
wherein the hardness of the tempered portion is 60% or less of the highest quenching hardness, and the area ratio of the lamella layer in the vertical cross section in the Zn coating layer is 5% to 20%.

3. The hot-stamped steel according to claim 1 or 2,
wherein the hardness of the tempered portion is 50% or less of the highest quenching hardness.

4. The hot-stamped steel according to claim 1 or 2,
wherein the hardness with a load of 10 kgf of the tempered portion is 180 Hv to 450 Hv.

5. The hot-stamped steel according to claim 1 or 2,
wherein the hot-stamped steel is produced by heating for a predetermined heating time so that the highest heating temperature is the $A_{c3}$ point or higher, working and quenching simultaneously through pressing by using a die, and tempering at a predetermined tempering temperature, and
when an $A_{c1}$ point of the base metal is represented by $A_{c1}$, the tempering temperature is represented by T in degrees ° C., and a concentration of Zn in the solid-solution phase after the quenching and before the tempering is represented by C in a unit of % by mass, the following Equation 1 is satisfied, $$A_{c1} \geq T \geq 700 - 4.0 \times (35.0 - C) \quad (1).$$

6. The hot-stamped steel according to claim 5,
wherein the tempering temperature is 700° C. to the $A_{c1}$ point of the base metal.

7. The hot-stamped steel according claim 1 or 2,
wherein a part of the base metal is the tempered portion.

8. The hot-stamped steel according to claim 5,
wherein a part of the base metal is the tempered portion.

9. The hot-stamped steel according to claim 6,
wherein a part of the base metal is the tempered portion.

* * * * *